(12) United States Patent
Hamabe (10) Patent No.: US 6,201,972 B1
(45) Date of Patent: Mar. 13, 2001

(54) CELLULAR SYSTEM AND FREQUENCY CARRIER ALLOCATION METHOD

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/274,782

(22) Filed: Mar. 23, 1999

(30) Foreign Application Priority Data

Mar. 26, 1998 (JP) .................................................. 10-079757

(51) Int. Cl.$^7$ ...................................................... H04Q 7/20
(52) U.S. Cl. ........................................... 455/450; 455/447
(58) Field of Search .................................. 455/446, 447, 455/448, 449, 450, 62, 522, 452, 453; 370/335, 342, 431, 441

(56) References Cited

U.S. PATENT DOCUMENTS

| 5,212,831 | * | 5/1993 | Chuang et al. | 455/450 |
| 5,613,200 | * | 3/1997 | Hamebe | 455/62 |
| 5,740,536 | * | 4/1998 | Benveniste | 455/447 |
| 5,999,818 | * | 12/1999 | Gilbert et al. | 455/450 |
| 6,052,366 | * | 4/2000 | Suzuki | 370/342 |

FOREIGN PATENT DOCUMENTS

| 0 899 972 A2 | 3/1999 | (EP) . |
| 8-275230 | 10/1996 | (JP) . |
| 9-500778 | 1/1997 | (JP) . |
| 11-75248 | 3/1999 | (JP) . |

OTHER PUBLICATIONS

Japanese Abstract 08275230 published Oct. 18, 1996.

* cited by examiner

*Primary Examiner*—Dwayne D. Bost
*Assistant Examiner*—Quochien B. Vuong
(74) *Attorney, Agent, or Firm*—Scully, Scott, Murray & Presser (57) ABSTRACT

In a frequency carrier arrangement method, first and second frequency bands to which frequency carriers used for uplink and downlink communications between the first and second base stations and the mobile stations are arranged such that frequencies do not overlap. A first frequency carrier group constituted by at least one frequency carrier and a second frequency carrier group constituted by at least one frequency carrier different from the first frequency carrier group are arranged in the first frequency band. A third frequency carrier group constituted by at least one frequency carrier and a fourth frequency carrier group constituted by at least one frequency carrier different from the third frequency carrier group are arranged in the second frequency band. Uplink and downlink communications are performed by using frequency carriers belonging to the second and third frequency carrier groups at the first base station. Uplink and downlink communications are performed by using frequency carriers belonging to the fourth and first frequency carrier groups at the second base station. A cellular system is also disclosed.

15 Claims, 6 Drawing Sheets

CELLULAR SYSTEM AND FREQUENCY CARRIER ALLOCATION METHOD

BACKGROUND OF THE INVENTION

The present invention relates to a frequency carrier allocation method for a cellular system using the FDD (Frequency Division Duplex) scheme of performing two-way communication between a base station and a mobile station by using different frequency carriers in the uplink and downlink directions and, more particularly, to a frequency carrier allocation method in a case wherein traffics in the uplink and downlink directions become asymmetrical to provide multimedia communication services or a cellular system in which the transmission efficiencies based on frequency carriers in the uplink and downlink directions become asymmetrical.

In general, in a cellular system using the FDD scheme, transmission and reception are simultaneously performed between a base station and a mobile station by using different frequency carriers in the uplink direction, in which signals are transmitted from the mobile station to the base station, and in the downlink direction, in which signals are transmitted from the base station to the mobile station.

In each cell (communication area) set for each base station, the allocated frequency carrier is divided with time or codes to virtually set many channels on one frequency carrier, thereby realizing communication between many mobile station and the base station with one frequency carrier.

In addition, each frequency carrier is simultaneously and repeatedly used in a plurality of cells to increase the number of frequency carriers that can be used in one cell.

A cellular system having a hierarchical structure is used. In this system, a plurality of micro-cells, each covering a range having a radius of about several hundred meters or less, are arranged in each macro-cell covering a range having a radius of about one kilometer or more. In a general hierarchical cellular system, macro-cells are set in correspondence with a plurality of macro-cell base stations, and micro-cells are set in correspondence with a plurality of micro-cell base stations in each macro-cell.

Each micro-cell is used to partly increase the traffic accommodation capacity in a place where many mobile stations gather and the entire traffic cannot be accommodated by one macro-cell or to provide high-quality communications to a place where radio waves from a macro-cell do not easily reach. If a frequency carrier having the same band width as that used by a macro-cell is allocated to a micro-cell, in particular, a traffic as large as that can be accommodated by the macro-cell can be accommodated by even the micro-cell having a small area. Therefore, even in an area where the traffic is very high, the traffic can be accommodated by using micro-cells.

In a cellular system having such a hierarchical structure, if the same frequency carrier is allocated to a macro-cell and a micro-cell, since the transmission power of the base station and a mobile station in the macro-cell is higher than that of the base station and a mobile station in the micro-cell, the macro-cell causes strong interference with the micro-cell. For this reason, different frequency carriers are used in the macro-cell and micro-cell.

Figure 4:
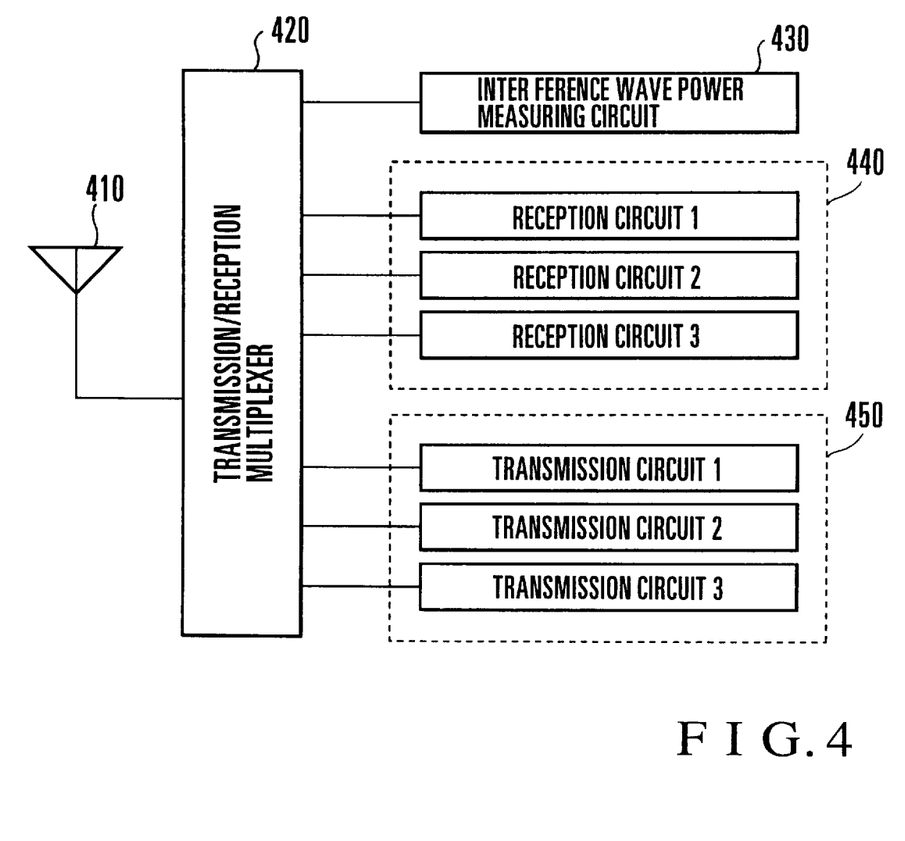
FIG. 4 is a block diagram showing the schematic arrangement of each of the transmission/reception apparatuses in macro-cell base stations and micro-cell base stations.
Figure 5:
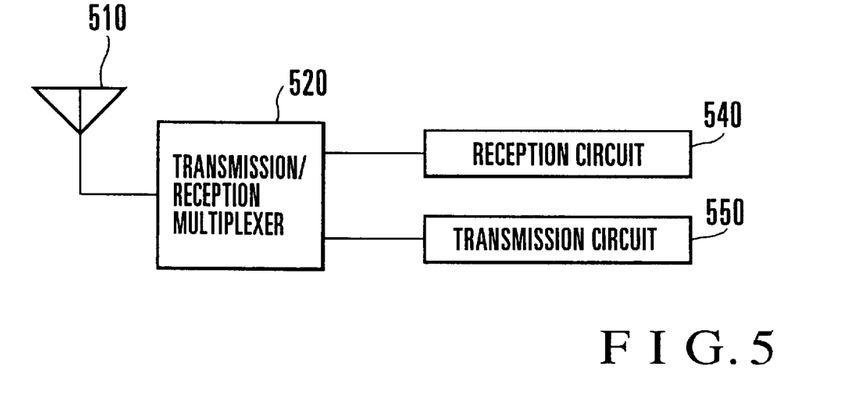
FIG. 5 is a block diagram showing the arrangement of the transmission/reception apparatus in a mobile station.

FIG. 4 shows the schematic arrangement of each of transmission/reception apparatuses in macro-cell base stations and micro-cell base stations. FIG. 5 shows the schematic arrangement of each of transmission/reception apparatuses in the mobile stations. As shown in FIG. 4, a plurality of reception circuits and a plurality of transmission circuits are connected to an antenna through a transmission/reception multiplexer. As shown in FIG. 5, in the mobile station, a pair of reception and transmission circuits are connected to an antenna through a transmission/reception multiplexer.

Referring to FIG. 4, in the base station, a reception section 440 includes three reception circuits, and a transmission section 450 also includes three transmission circuits. The three reception circuits of the reception section 440 and the three transmission circuits of the transmission section 450 are connected to an antenna 410 through a transmission/reception multiplexer 420. An interference wave power measuring circuit 430 is connected to the transmission/reception multiplexer 420 to measure the reception power of interference waves coming from neighboring mobile stations.

Referring to FIG. 5, in the mobile station, a pair of a reception circuit 540 and a transmission circuit 550 are connected to an antenna 510 through a transmission/reception multiplexer 520.

As described above, the base and mobile stations respectively use transmission/reception multiplexers 420 and 520 each used to separate transmission and reception signals having different frequencies. Since transmission and reception signals that are simultaneously transmitted/received greatly differ in level, they must be separated sufficiently.

For this reason, the frequency intervals between frequency carriers used in the uplink direction and frequency carriers used in the downlink direction must be sufficiently larger than those between frequency carriers used in the same communication direction. The FDD scheme therefore uses two frequency bands separated from each other by a protective band width which is the frequency interval required to separate transmission and reception signals in the transmission/reception multiplexer 420. One of these frequency bands is exclusively allocated to communications in the downlink direction, and the other is exclusively allocated to communications in the uplink direction.

Figure 6:
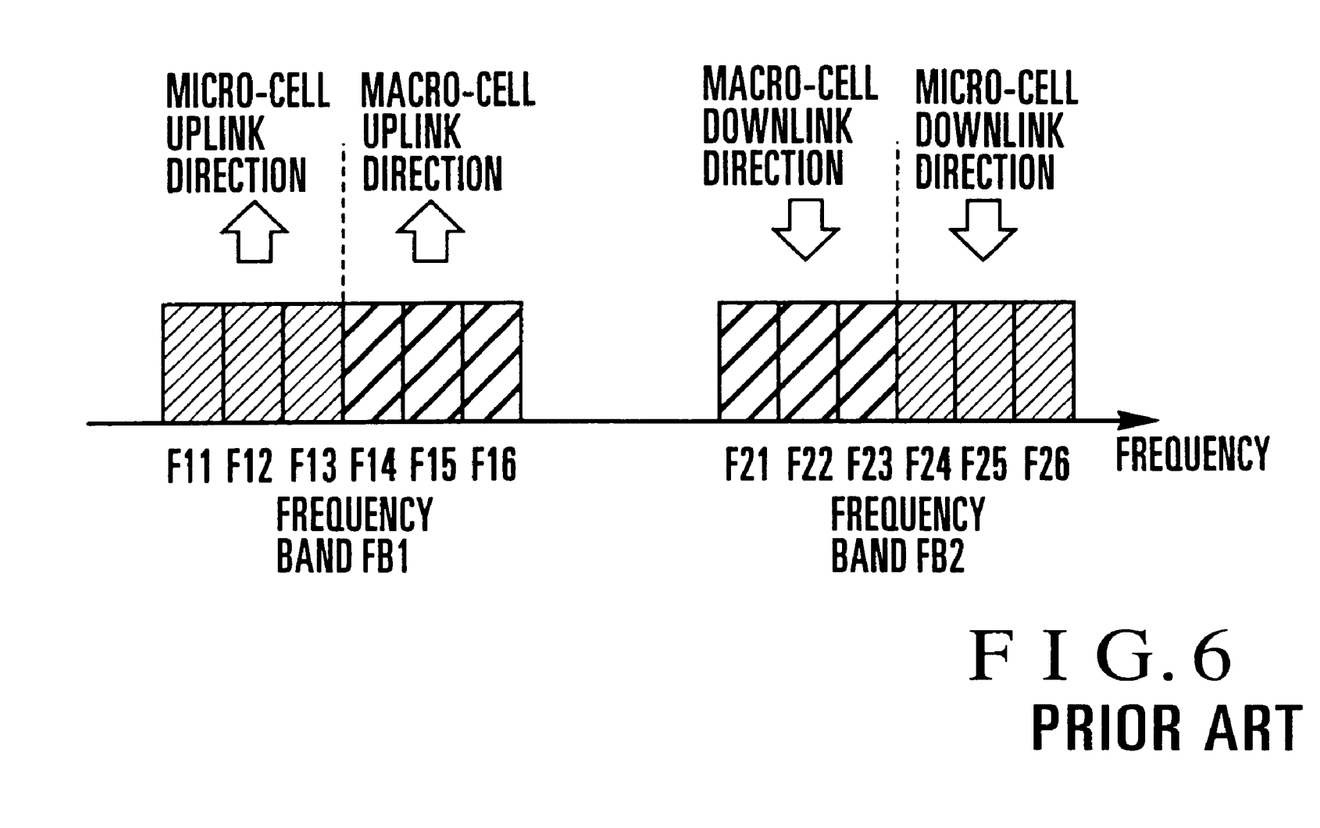
FIG. 6 is a view for explaining a conventional frequency carrier arrangement method.

As described above, since different frequency carriers are allocated to macro-cells and micro-cells, a frequency carrier arrangement (allocation) like the one shown in FIG. 6 is used. In this frequency carrier arrangement, the numbers of frequency carriers used in the respective directions are constant.

In general, as described above, two frequency bands FB1 and FB2 have the same width, and the numbers of frequency carriers F11 to F16 and F21 to F26 in the downlink and uplink directions are the same. In the FDD scheme, if, therefore, the traffic ratios in the uplink and downlink directions differ, a frequency carrier shortage occurs in the direction in which the traffic is larger, while the frequency carriers cannot be fully used in the direction in which the traffic is smaller.

Assume that the traffic ratios in the uplink and downlink directions are the same. Even in this case, if the transmission efficiency based on the frequency carriers in one of the uplink and downlink directions is higher than that in the other direction, a frequency carrier shortage occurs in the direction in which the transmission efficiency is lower, while some of the frequency carriers in the opposite direction are left unused, and all the frequency carriers cannot be effectively used.

As a method of solving this problem, a method is disclosed in Japanese Patent Laid-Open No. 8-275230, in which the frequency carrier passband in the downlink direction is set to be larger than that in the uplink direction, and uplink frequency carriers and downlink frequency carriers are alternately arranged in the respective frequency bands.

According to this method, by allocating frequency carriers from the different frequency bands to each mobile station in the uplink and downlink directions, the utilization efficiency of the frequency bands can be increased while the required frequency interval between transmission and reception signals is ensured in each transmission/reception multiplexer even if the traffic in the downlink direction is larger than that in the uplink direction.

In this method, however, frequency carrier passbands in the uplink and downlink directions must be determined in advance by predicting traffic ratios and transmission efficiencies in the uplink and downlink directions. Although transmitters and receivers used in base stations and mobile stations must be designed in accordance with the respective passbands, the arrangements of the transmitter and receiver of each mobile station, in particular, are difficult to change.

For this reason, if the traffic ratios in the uplink and downlink directions change with changes in communication services provided by a system or the transmission efficiencies in the uplink and downlink directions change with advances in technology, the distribution of frequency bands cannot be easily changed in accordance with these changes, resulting in a deterioration in the utilization efficiency of the frequency bands.

There are therefore demands for a technique of distributing frequency resources in accordance with the needs in the uplink and downlink directions by only changing the arrangement of frequency carriers without changing the arrangement of the receiver of each mobile station even if the traffic ratios in the uplink and downlink directions are difficult to predict or the transmission efficiencies per frequency band in the uplink and downlink directions change with advances in technology in the future.

Figure 7:
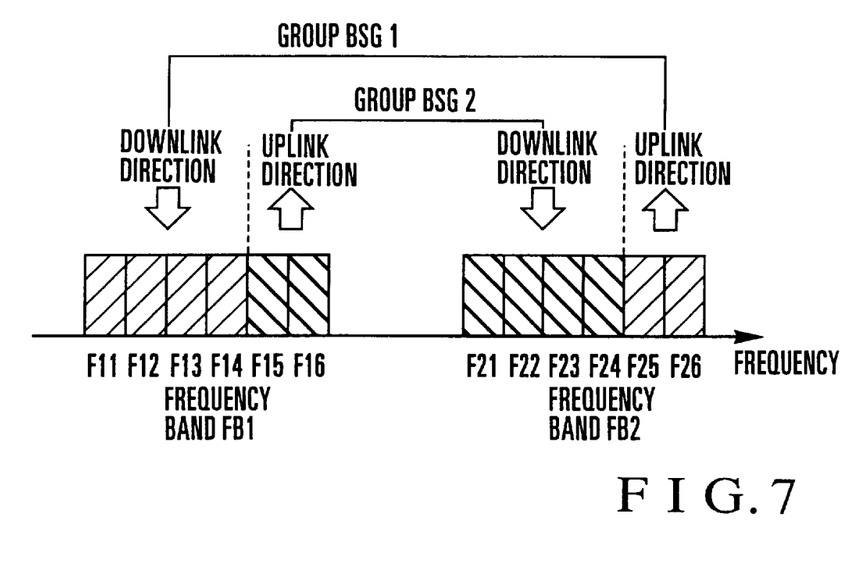
FIG. 7 is a view for explaining an asymmetrical frequency carrier arrangement method.
Figure 8:
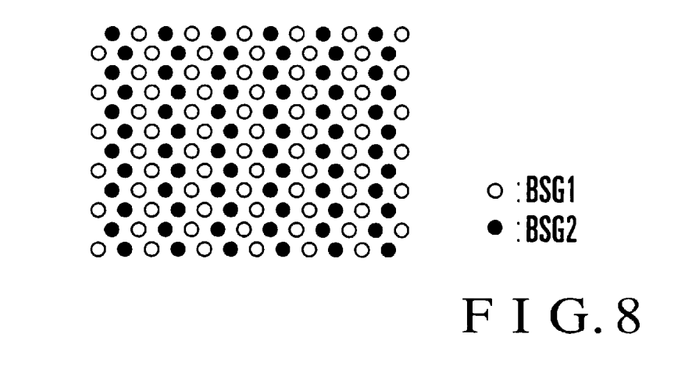
FIG. 8 is a view for explaining how base stations are classified according to their positions into groups in an asymmetrical frequency carrier arrangement method.

To solve this problem, frequency carriers may be asymmetrically arranged, as shown in FIGS. 7 and 8. As shown in FIG. 8, base stations are classified according to their positions into two groups BSG1 and BSG2. Referring to FIG. 8, white and black dots indicate the positions of the base stations; the white dots represent the base stations belonging to the group BSG1, and the black dots represent the base stations belonging to the group BSG2.

Each base station belonging to the group BSG1 selects frequency carriers in the downlink and uplink directions from frequency bands FB1 and FB2. For example, as shown in FIG. 7, such base stations respectively select frequency carriers F11 to F14 of the frequency band FB1 as frequency carriers in the downlink directions, and frequency carriers F25 and F26 of the frequency band FB2 as frequency carriers in the uplink direction.

Each base station belonging to the group BSG2 selects frequency carriers in the downlink and uplink directions from frequency bands different from those corresponding to the group BSG1. For example, as shown in FIG. 7, such base stations respectively select frequency carriers F21 to F24 of the frequency band FB2 as frequency carriers in the downlink direction, and frequency carriers F15 and F16 of the frequency band FB1 as frequency carriers in the uplink direction.

In this method, frequency carriers can be asymmetrically arranged in the uplink and downlink directions for the respective base stations and mobile stations while the frequency intervals between the frequency carriers in the uplink and downlink directions are separated by the protective band width or more.

Figure 9:
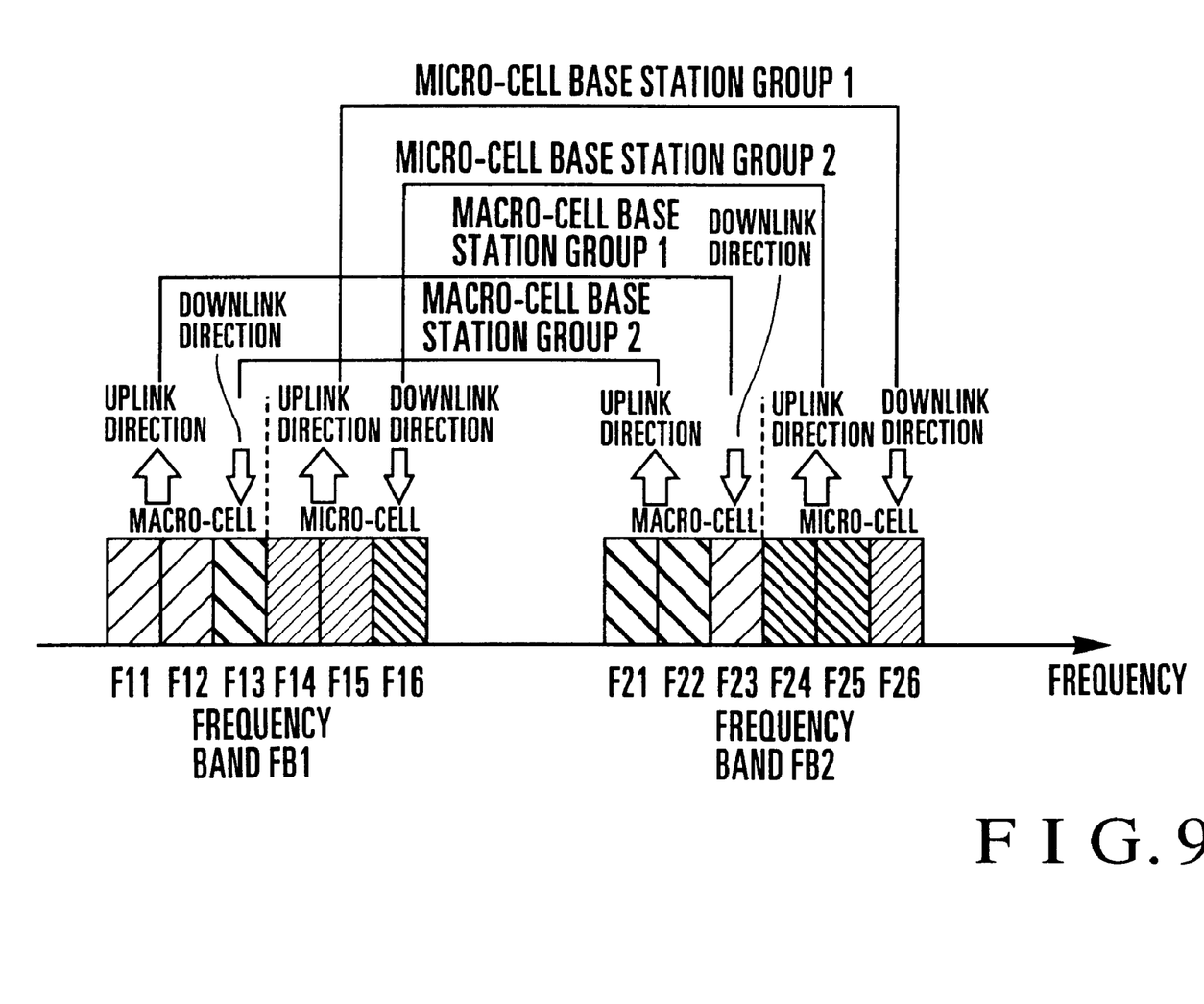
FIG. 9 is a view for explaining an asymmetrical frequency carrier arrangement method in the hierarchical cellular system.

When this method is applied to a cellular system having a hierarchical structure constituted by macro-cells and micro-cells in consideration of the necessity for arranging different frequency carriers between macro-cells and micro-cells, a frequency carrier arrangement like the one shown in FIG. 9 may be obtained.

In this case, macro-cell base station group 1 selects the frequency carriers F11 and F12 of the frequency band FB1 as frequency carriers in the uplink direction, and selects the frequency carrier F23 of the frequency band FB2 as a frequency carrier in the downlink direction. Macro-cell base station group 2 selects the frequency carriers F21 and F22 of the frequency band FB2 as frequency carriers in the uplink direction, and selects the frequency carrier F13 of the frequency band FB1 as a frequency carrier in the downlink direction.

Micro-cell base station group 1 selects the frequency carriers F14 and F15 of the frequency band FB1 as frequency carriers in the uplink direction, and selects the frequency carrier F26 of the frequency band FB2 as a frequency carrier in the downlink direction. Micro-cell base station group 2 selects the frequency carriers F24 and F25 of the frequency band FB2 as frequency carriers in the uplink direction, and selects the frequency carrier F16 of the frequency band FB1 as a frequency carrier in the downlink direction.

In general, when a cellular system uses the code division multiple access (CDMA) scheme as a radio access scheme, the same frequency carrier can be simultaneously set for all the cells. Therefore, in a cellular system having a hierarchical structure constituted by two levels corresponding to macro-cells and micro-cells, the set frequency carriers can be simultaneously used in all the cells on the respective levels.

According to the method in FIG. 9, which is associated with the frequency carrier arrangement for the hierarchical cellular system, frequency carriers can be simultaneously set and used only between base stations belonging to the same base station group. When, therefore, the CDMA scheme is used as a radio access scheme, the same frequency carrier can be simultaneously used only between base stations belonging to the same base station group on the respective levels, i.e., the macro- and micro-cell levels.

This means that when base stations are classified into two groups on each level as shown in FIG. 8, each frequency carrier can be simultaneously used only in half of the macro-cells or half of the micro-cells. As compared with the case wherein the CDMA scheme is used to allocate the same frequency carrier to all the cells, according to the method shown in FIG. 9, the number of frequency carriers that can be set for each cell is reduced to half, provided that the total number of frequency carriers remains the same.

In addition, in the method in FIG. 9, the traffic that can be accommodated by one frequency carrier does not increase much. According to the CDMA scheme, the traffic that can be accommodated by one frequency carrier is limited by the total amount of interference wave power received from communications between the base station and other mobile stations in the same cell and communications between the base stations and mobile stations in neighboring cells.

If the number of cells that use the same frequency carrier is reduced to half, the interference wave power from neighboring cells decreases to almost half. However, the interference wave power in the same cell remains unchanged. For this reason, the reduction ratio of interference wave power is lower than 50%, and an increase in accommodated traffic per frequency carrier is smaller than a two-fold. That is, the traffic that can be accommodated by one frequency carrier does not increase much.

According to the frequency carrier arrangement in the conventional hierarchical cellular system in FIG. 9, therefore, the traffic that can be accommodated by each cell decreases, which is given by the product of the number of frequency carriers per cell and the accommodated traffic per frequency carrier. As a result, the utilization efficiency of frequency carriers per cell decreases.

SUMMARY OF THE INVENTION

It is an object of the present invention to provide a cellular system which can increase the utilization efficiency of frequency carriers and a frequency carrier arrangement method for the system.

It is another object of the present invention to provide a cellular system which can rearrange frequency carriers in accordance with a change in the ratio of traffics in the uplink and downlink directions and the like.

In order to achieve the above objects, according to the present invention, there is provided a frequency carrier arrangement method for a cellular system made up of a plurality of first base stations having first communication areas, a plurality of second base stations having second communication areas, and a plurality of mobile stations for performing radio communications with the first and second base stations, comprising the steps of arranging first and second frequency bands to which frequency carriers used for uplink and downlink communications between the first and second base stations and the mobile stations such that frequency bands do not overlap, arranging a first frequency carrier group constituted by at least one frequency carrier and a second frequency carrier group constituted by at least one frequency carrier different from the first frequency carrier group in the first frequency band, arranging a third frequency carrier group constituted by at least one frequency carrier and a fourth frequency carrier group constituted by at least one frequency carrier different from the third frequency carrier group in the second frequency band, performing uplink and downlink communications by using frequency carriers belonging to the second and third frequency carrier groups at the first base station, and performing uplink and downlink communications by using frequency carriers belonging to the fourth and first frequency carrier groups at the second base station.

DESCRIPTION OF THE PREFERRED EMBODIMENT

The present invention will be described in detail below with reference to the accompanying drawings.

Figure 3:
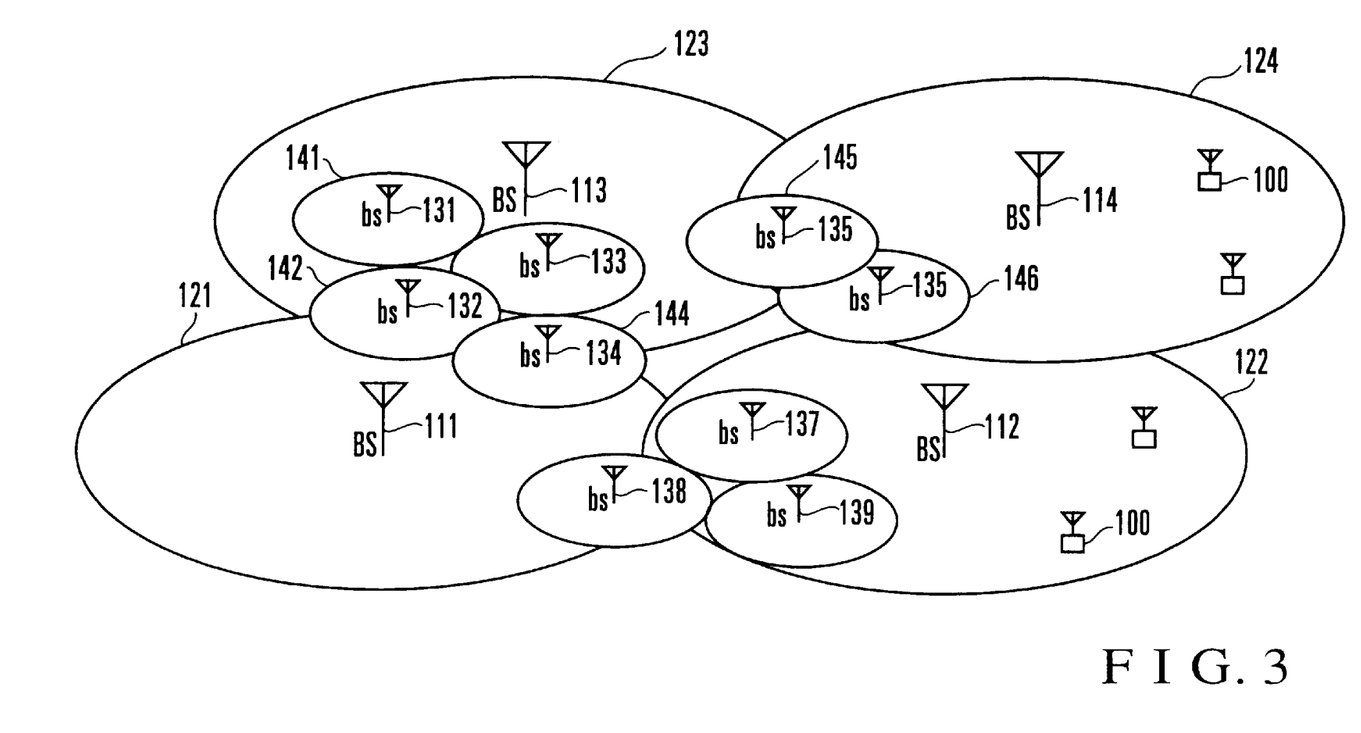
FIG. 3 is a view showing the concept of a hierarchical cellular system to which the present invention is applied.

FIG. 3 shows a hierarchical cellular system to which the present invention is applied. In the hierarchical cellular system in FIG. 3, macro-cells 121 to 124 are arranged in correspondence with a plurality of macro-cell base stations (BS) 111 to 114. In the macro-cells 121 to 124, micro-cells 141 to 149 are arranged in correspondence with a plurality of micro-cell base stations (bs) 131 to 139. The micro-cells 141 to 149 are arranged in places where mobile stations are present at high densities.

Many mobile stations 100 are present in the macro-cells 121 to 124 and the micro-cells 141 to 149. The macro-cells 121 to 124 transmit signals to the mobile stations 100 with transmission power larger than that used by the micro-cells 141 to 149. Similarly, when the mobile stations 100 are connected to the macro-cell base stations (BS) 111 to 114, the mobile stations transmit signals with power larger than that used when they are connected to the micro-cell base stations (bs) 131 to 139. The macro-cell base stations (BS) 111 to 114 therefore communicate with the mobile stations 100 in larger ranges than the micro-cell base stations (bs) 131 to 139.

The transmission/reception apparatuses in the macro-cell base stations (BS) 111 to 114 and in the micro-cell base stations (bs) 131 to 139 have the same arrangement. As shown in FIG. 4, each transmission/reception apparatus includes an interference wave power measuring circuit 430, a plurality of reception circuits 440, and a plurality of transmission circuits 450. The reception circuits 440 and the transmission circuits 450 are connected to a base station antenna 410 through a transmission/reception multiplexer 420.

As shown in FIG. 5, the transmission/reception apparatus of each mobile station 100 has a pair of a reception circuit 540 and a transmission circuit 550 connected to a mobile station antenna 510 through a transmission/reception multiplexer 520.

Figure 1:
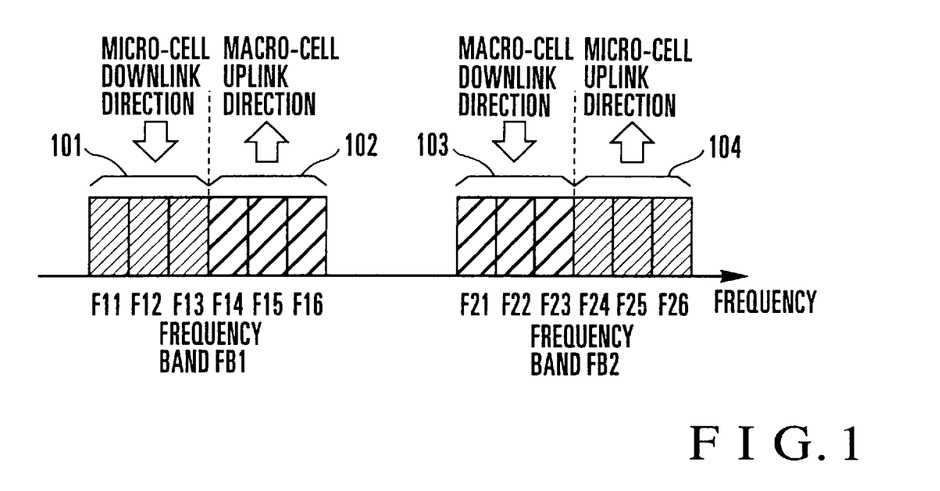
FIG. 1 is a view showing frequency bands and a frequency carrier arrangement according to an embodiment of the present invention.

A frequency carrier arrangement method according to an embodiment of the present invention will be described next with reference to FIG. 1. In this embodiment, as shown in FIG. 1, two frequency bands, i.e., a frequency band FB1 (first frequency band) and a frequency band FB2 (second frequency band), are used.

These two frequency bands are separated from each other by a predetermined frequency interval required to separate reception and transmission signals in the transmission/reception multiplexers 420 and 520, and the frequencies are arranged not to overlap each other.

In the frequency bands FB1 and FB2, the predetermined same numbers of frequency carriers are arranged. Referring to FIG. 1, six frequency carriers are set in each of the frequency bands FB1 an FB2. In the frequency band FB1, frequency carriers F11 to F16 are sequentially arranged in the increasing order of frequencies. In the frequency band FB2, frequency carriers F21 to F26 are sequentially arranged in the increasing order of frequencies.

A plurality of frequency carriers to be used in the uplink directions are selected from the different frequency bands FB1 and FB2 and arranged for the macro-cell base stations (BS) 111 to 114 and the micro-cell base stations (bs) 131 to 139. In addition, a plurality of frequency carriers used in the downlink direction are selected from portions of the different frequency bands FB1 and FB2, other than the portions of the frequency bands from which the frequency carriers in the uplink directions are selected, and are arranged.

More specifically, as shown in FIG. 1, the frequency carriers F 14 to F 16 are selected from the frequency band FB1 as frequency carriers for the macro-cells 121 to 124 in the uplink direction. The frequency carriers F24 to F26 are selected from the frequency band FB2 different from the frequency band FB1, which is used for the macro-cells 121 to 124 in the uplink direction, as frequency carriers for the micro-cells 141 to 144 in the uplink direction.

Similarly, the frequency carriers F21 to F23 are selected from the frequency band FB2 different from the frequency band FB1, which is used for the macro-cells 121 to 124 in the uplink direction, as frequency carriers for the macro-cells 121 to 124 in the downlink direction. The frequency carriers F11 to F13 are selected from the frequency band FB1 different from the frequency band FB, which is used for the macro-cells 141 to 149 in the uplink direction, as frequency carriers for the micro-cells 141 to 149 in the downlink direction.

With this operation, in the respective base stations 111 to 114 and 131 to 139, the frequency intervals between the frequency carriers in the uplink and downlink directions become equal to or more than the protective band width that allows signal separation in the transmission/reception multiplexers 420 an 520, and transmission and reception signals having a large level difference can be satisfactorily separated from each other.

Although different frequency carriers are arranged in the macro-cells 121 to 124 and micro-cells 141 to 149, if the CDMA scheme is used as a radio access scheme, the same frequency carrier can be simultaneously set and used in all the macro-cells 121 to 124. In addition, the same frequency carrier can be set and used in all the micro-cells.

The operation of the present invention will be described next with reference to FIGS. 1 and 3.

Assume that in the hierarchical cellular system shown in FIG. 3, the numbers of mobile stations 100 in the macro-cells 121 to 124 and the micro-cells 141 to 149 are almost the same, and the traffics in the respective cells are also equal. Assume also that the traffic in the uplink direction is equal to that in the downlink direction, and the traffic capacity per frequency carrier in the uplink direction is equal to that in the downlink direction.

In this case, the total number of frequency carriers F11 to F16 and F21 to F26 present in the frequency bands FB1 and FB2 is 12. If, therefore, the frequency carriers are allocated by threes to the macro-cells 121 to 124 in the uplink and downlink directions and the micro-cells 141 to 149 in the uplink and downlink directions, the ratios of traffics in the respective cells to the overall traffic capacity become equal. The overall traffic capacity is given by the product of the number of frequency carriers and the traffic capacity per frequency carrier.

In this case, a frequency carrier group (a second frequency carrier group) 102 allocated to the frequency band FB1, i.e., the frequency carriers F14, F15, and F16, are arranged for all the macro-cells 121 to 124. In addition, a frequency carrier group (third frequency carrier group) 103 set in the frequency band FB2, i.e., the frequency carriers F21, F22, and F23, are arranged in the downlink direction.

Similarly, a frequency carrier group (fourth frequency carrier group) 104 allocated to the frequency band FB2, i.e., the frequency carriers F24, F25, and F26, are arranged for all the macro-cells 141 to 149 in the uplink direction. A frequency carrier group (first frequency carrier group) 101 allocated to the frequency band FB1, i.e., the frequency carriers F11, F12, and F13, are arranged in the downlink direction.

With this frequency carrier arrangement, when the mobile station 100 generates a communication request, and this mobile station is present in one of the micro-cells 141 to 149, the mobile station is connected to a corresponding one of the micro-cell base stations 131 to 139 to perform communication. If this mobile station is not present in any of the micro-cells 141 to 149, the mobile station performs communication after connected to one of the macro-cell base stations 111 to 114 which corresponds to one of the micro-cells 121 to 124 in which the mobile station is present.

In each of the macro-cell base stations 111 to 114 and micro-cell base stations 131 to 139, the interference wave power measuring circuit 430 (FIG. 4) measures reception power at the frequency of each frequency carrier set in the corresponding cell. If there is a frequency carrier exhibiting a measured reception power value smaller than a predetermined value, a corresponding one of the base stations 111 to 114 and 131 to 139 performs new communication with the mobile station 100 by using the frequency carrier.

When this frequency carrier arrangement is compared with the conventional frequency carrier arrangement shown in FIG. 6, the numbers of frequency carriers arranged in the macro-cells 121 to 124 and micro-cells 141 to 149 in the uplink and downlink directions are the same in both the arrangements, and the respective frequency carriers are arranged in all the macro-cells 121 to 124 and all the micro-cells 141 to 149 and used with the same efficiency.

With this frequency carrier arrangement of the present invention, the frequency utilization efficiency is the same as that with the conventional frequency carrier arrangement in FIG. 6.

Referring to FIG. 9 showing another example of the frequency carrier arrangement, the numbers of frequency carriers in the uplink and downlink directions cannot be made equal in the respective macro-cells and micro-cells, and hence this arrangement cannot be simply compared with the arrangement of the present invention. Assume that eight frequency carriers are present in one frequency carrier band, and the numbers of frequency carriers in the uplink and downlink directions are made equal.

In this case, according to the frequency carrier arrangement shown in FIG. 9, the respective frequency carriers arranged in the macro-cells can be simultaneously arranged and used in only the macro-cells belonging to the same group of macro-cell base station groups 1 and 2. Similarly, the respective frequency carriers arranged in the micro-cells can be simultaneously arranged and used in only the micro-cells belonging to the same group of micro-cell base station groups 1 and 2.

With the frequency carrier arrangement in FIG. 9, therefore, the number of frequency carriers arranged in each cell decreases to half, but the traffic that can be accommodated by each frequency carrier is smaller than a two-fold. For this reason, the traffic that can be accommodated in each cell is smaller than that with each of the frequency carrier arrangements shown in FIGS. 1 and 6, and the utilization efficiency of frequency carriers decreases.

A case wherein when the frequency carrier arrangement shown in FIG. 1 is used, the traffic in the downlink direction increases to twice that in the uplink direction will be described next.

In this case, when two frequency carriers of the 12 frequency carriers F11 to F16 and F21 to F26 in the frequency bands FB1 and FB2 are allocated to the macro-cells 121 to 124 in the uplink direction; four frequency carriers, to the macro-cells 121 to 124 in the downlink direction; two frequency carriers, to the micro-cells 141 to 149 in the uplink direction; and four frequency carriers, to the micro-cells 141 to 149 in the downlink direction, the ratios of traffics in the respective cells to the overall traffic capacity become equal.

The frequency carrier F14 arranged for the macro-cells 121 to 124 in the uplink direction in FIG. 1 is therefore rearranged (complementarily increased/decreased) for the micro-cells 141 to 149 in the downlink direction. In addition, the frequency carrier F24 arranged for the micro-cells 141 to 149 in the uplink direction is rearranged (complementarily increased/decreased) for the macro-cells 121 to 124 in the downlink direction.

Figure 2:
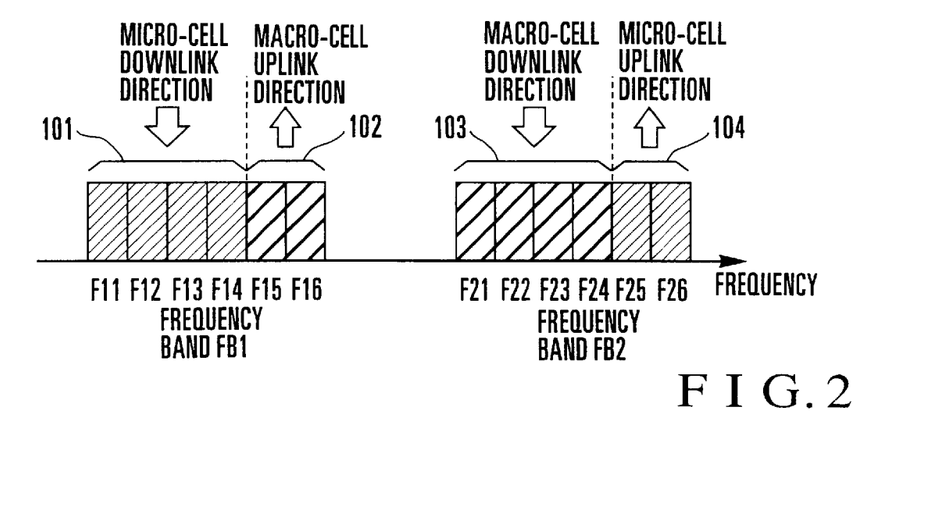
FIG. 2 is a view showing changed frequency bands and a changed frequency carrier arrangement.

More specifically, as shown in FIG. 2, the frequency carriers F15 and F16 of the frequency band FB1 are arranged as the frequency carrier group 102 for the macro-cells 121 to 124 in the uplink direction. In addition, the frequency carriers F21 to F24 of the frequency band FB2 are arranged as the frequency carrier group 103 in the downlink direction.

On the other hand, the frequency carriers F25 and F26 of the frequency band FB2 are arranged as the frequency carrier group 104 for the micro-cells 141 to 149 in the uplink direction. In addition, the frequency carriers F11 to F14 of the frequency band FB1 are arranged as the frequency carrier group 101 in the downlink direction.

In this frequency carrier rearrangement, both the frequency bands FB1 and FB2 are rearranged by selecting the frequency carriers F14 and F24, among the frequency carrier groups 102 and 104, which are adjacent to the frequency carrier groups 101 and 103.

In this manner, one of the traffic capacities in the uplink and downlink directions can be made larger than the other by only changing the frequency carrier arrangement without changing the arrangement of each of the transmission/reception apparatuses in the base stations 111 to 114 and 131 to 139 and in the mobile stations 100. Note that a method of starting communication by allocating a frequency carrier upon generation of a communication request from the mobile station 100 is the same as that described above.

The changed frequency carrier arrangement described above is compared with the conventional frequency carrier arrangement in FIG. 6. Referring to FIG. 6, when a traffic equal to the traffic accommodated by three frequency carriers is produced in either a macro-cell or a micro-cell in the downlink direction, no traffic can be accommodated in the downlink direction any more. On the other hand, since the traffic in the uplink direction is half that in the downlink direction, only half the traffic capacity corresponding to three frequency carriers is used in the uplink direction.

In contrast to this, according to the frequency carrier arrangement shown in FIG. 2, when a traffic equal to the traffic accommodated by four frequency carriers is produced in each of the macro-cells 121 to 124 or each of the micro-cells 141 to 149 in the downlink direction, the traffic produced in the uplink direction, which is half the traffic in the downlink direction, can be accommodated by using two frequency carriers.

The traffic that can be accommodated in the downlink direction with the frequency carrier arrangement in FIG. 2 is therefore 4/3 times that with the frequency carrier arrangement in FIG. 6, and the traffic that can be accommodated in the uplink direction is also 4/3 times that with the arrangement in FIG. 2. That is, an increase in accommodated traffic can be achieved by arranging more frequency carriers in the downlink direction than in the uplink direction.

According to the frequency carrier arrangement in FIG. 9, although frequency carriers can be arranged at the same ratio as that of the produced traffic, the utilization efficiency of each frequency carrier decreases because the traffic that can be accommodated in each cell is small, as described above. In this manner, the frequency carrier arrangement shown in FIG. 2 can obtain higher frequency utilization efficiency than the frequency carrier arrangement shown in FIG. 9.

Consider a case wherein when the frequency carrier arrangement in FIG. 1 is used, the traffic capacity per frequency carrier in the uplink direction is increased to twice that in the downlink direction by applying a new technique to the base stations 114 to 114 and 131 to 139.

In this case, when two frequency carriers of the 12 frequency carriers F11 to F16 and F21 to F26 present in the frequency bands FB1 and FB2 are allocated to the macro-cells 121 to 124 in the uplink direction; four frequency carriers, to the macro-cells 121 to 124 in the downlink direction; two frequency carriers, to the micro-cells 141 to 149 in the uplink direction; and four frequency carriers, to the micro-cells 141 to 149 in the downlink direction, the ratios of traffics produced in the respective cells to the overall traffic capacity become equal.

As the above new technique, for example, an interference cancellation technique of suppressing signals from other mobile stations 100 may be used in the base stations 111 to 114 and 131 to 139.

In such a case, as in the case wherein the traffic in the downlink direction becomes twice that in the uplink direction, the frequency carrier F14 arranged in the macro-cells 121 to 124 in the uplink direction is changed to a frequency carrier arranged in the micro-cells 141 to 149 in the downlink direction, and the frequency carrier F24 arranged in the micro-cells 141 to 149 in the uplink direction is changed to a frequency carrier arranged in the macro-cells 121 to 124 in the downlink direction, thereby obtaining a frequency carrier arrangement like the one shown in FIG. 2.

The same processing as described above can be applied to a case wherein when a communication request is generated by the mobile station 100, communication is started upon allocation of a frequency carrier. More specifically, when there is a frequency carrier exhibiting a reception power value smaller than a predetermined value, communication is started by using the new mobile station 100 and the frequency carrier. Note that the predetermined value in the direction in which an interference canceler is used is a value corresponding to the performance of the canceler. In general, when the interference canceler is used, communication can be performed even even if the reception power of an interference wave is high. The predetermined value is therefore a relatively large value.

As described above, even if the accommodated traffic capacity of one frequency carrier changes in either the uplink direction or the downlink direction, the accommodated traffic capacities in the respective cells in the uplink and downlink directions can be made equal by only changing the frequency carrier arrangement without changing the arrangement of each of the transmission/reception apparatuses in the base stations 111 to 114 and 131 to 139 and in the mobile stations 100.

The changed frequency carrier arrangement described above is compared with the conventional frequency carrier arrangement shown in FIG. 6. Referring to FIG. 6, when a traffic equal to the traffic accommodated by three frequency carriers is produced in either a macro-cell or a micro-cell in the downlink direction, no traffic can be accommodated in the downlink direction any more. On the other hand, since the traffic accommodated by one frequency carrier in the uplink direction is twice that in the downlink direction, only half the traffic capacity corresponding to three frequency carriers is used in the uplink direction.

In contrast to this, according to the frequency carrier arrangement shown in FIG. 2, when a traffic equal to the traffic accommodated by four frequency carriers is produced in each of the macro-cells 121 to 124 or each of the micro-cells 141 to 149 in the downlink direction, the traffic in the uplink direction becomes the same as that in the downlink direction. However, since the accommodated traffic capacity of one frequency carrier in the uplink direction is twice that in the downlink direction, the produced traffic can be accommodated by using two frequency carriers arranged in the uplink direction.

As described above, the traffic that can be accommodated in the downlink direction with the frequency carrier arrangement in FIG. 2, is 4/3 times that with the frequency carrier arrangement in FIG. 6, and the traffic that can be accommodated in the uplink direction is also 4/3 times that with the arrangement in FIG. 2. The overall accommodated traffic can therefore be increased by arranging more frequency carriers in the uplink direction than in the downlink direction.

According to the frequency carrier arrangement in FIG. 9, as described above, the traffic that can be accommodated in each cell is small, and hence the utilization efficiency of each frequency carrier is low. For this reason, the frequency carrier arrangement in FIG. 2 can obtain higher frequency utilization efficiency than the frequency carrier arrangement in FIG. 9.

In the embodiment described above, of the respective frequency carriers, the frequency carriers belonging to the same frequency band and used for communications in the same direction (i.e., the frequency carriers belonging to the same frequency carrier group) are sequentially arranged along the frequency axis. However, the present invention can also be applied to a case wherein these frequency carriers are not continuously arranged, and the same effect as that described above can be obtained.

Consider the interference between frequency carriers belonging to the same frequency band. In general, the interference between frequency carriers used in different communication directions, i.e., between frequency carriers in the uplink and downlink directions (to be referred to as an opposite-direction carrier boundary hereinafter), is larger than the interference between frequency carriers used in the same communication direction, i.e., between frequency carriers in the uplink direction or between frequency carriers in the downlink direction (to be referred to as a same-direction carrier boundary hereinafter).

For example, in FIG. 1, there is an opposite-direction carrier boundary between the frequency carriers F13 and F14. In this case, if a mobile station B (not shown) that performs uplink communication with a base station by using the frequency carrier F14 is present near a mobile station A (not shown) that performs downlink communication with a base station by using the frequency carrier F13, the frequency carrier F14 from the mobile station B is received by the mobile station A without much attenuation. As a result, larger interference occurs with respect to the frequency carrier F13 in the mobile station A.

The number of opposite-direction carrier boundaries can be reduced, and a decrease in communication efficiency due to interference caused by such boundaries can be suppressed by sequentially arranging frequency carriers belonging to the same frequency band and used for communications in the same direction (i.e., frequency carriers belonging to the same frequency carrier group) along the frequency axis.

When frequency carriers belonging to the same frequency carrier group are to be rearranged in different cells, an increase in the number of opposite-direction carrier boundaries can be avoided, and a decrease in communication efficiency due to interference caused at the opposite-direction carrier boundaries can be suppressed by rearranging frequency carriers nearest to the opposite-direction carrier boundaries.

In the embodiment described above, the frequency carrier arrangement is used between the macro-cells 121 to 124 and the micro-cells 141 to 149 constituting the hierarchical cellular system. However, the present invention is not limited to this and can be applied between cells belonging to different cellular systems.

For example, even in a case wherein the same frequency bands are to be shared among cellular systems managed by different operators (service providers), there is a possibility that the above frequency carrier rearrangement is required in accordance with a change in traffic and the like.

In this case, if the macro-cells 121 to 124 are regarded as cells (first cells) belonging to one cellular system and the micro-cells 141 to 149 are regarded as cells (second cells) belonging to the other cellular system, the present invention can be applied without any change, and the same function and effect as those described above can be obtained.

As has been described above, according to the present invention, frequency carriers can be rearranged in accordance with changes in traffic ratios in the uplink and downlink directions and traffic based on one frequency carrier. In addition, since frequency carriers can be simultaneously used in all the cells in the respective communication areas of macro-cell base stations and micro-cell base stations or the respective communication areas of base stations belonging to different communication system, a high frequency carrier utilization efficiency can be obtained.

What is claimed is:

1. A frequency carrier arrangement method for a cellular system made up of a plurality of first base stations having first communication areas, a plurality of second base stations having second communication areas, and a plurality of mobile stations for performing radio communications with said first and second base stations, comprising the steps of:

arranging first and second frequency bands to which frequency carriers used for uplink and downlink communications between said first and second base stations and said mobile stations such that frequency bands do not overlap;

arranging a first frequency carrier group constituted by at least one frequency carrier and a second frequency carrier group constituted by at least one frequency carrier different from the first frequency carrier group in the first frequency band;

arranging a third frequency carrier group constituted by at least one frequency carrier and a fourth frequency carrier group constituted by at least one frequency carrier different from the third frequency carrier group in the second frequency band;

performing uplink and downlink communications by using frequency carriers belonging to the second and third frequency carrier groups at said first base station; and performing uplink and downlink communications by using frequency carriers belonging to the fourth and first frequency carrier groups at said second base station.

2. A method according to claim 1, further comprising determining the numbers of frequency carriers belonging to the first and second frequency carrier groups in accordance with traffic and traffic capacity per frequency carrier in the uplink and downlink directions, and determining the numbers of frequency carriers belonging to the third and fourth frequency carrier groups with changes in the numbers of frequency carriers belonging to the first and second frequency carrier groups.

3. A method according to claim 2, wherein the step of determining the numbers of frequency carriers belonging to the first and second frequency carrier groups comprises the step of increasing the number of frequency carriers belonging to the first frequency carrier group when the traffic in the downlink direction increases, and the step of determining the numbers of frequency carriers belonging to the third and fourth frequency carrier groups comprises the step of increasing the number of frequency carriers belonging to the third frequency carrier group when the traffic in the downlink direction increases.

4. A method according to claim 2, wherein the step of determining the numbers of frequency carriers belonging to the first and second frequency carrier groups comprises the step of increasing the number of frequency carriers belonging to the second frequency carrier group when the traffic in the uplink direction increases, and the step of increasing the numbers of frequency carriers belonging to the third and fourth frequency carrier groups comprises the step of increasing the number of frequency carriers belonging to the fourth frequency carrier group when the traffic in the uplink direction increases.

5. A method according to claim 2, wherein the step of determining the numbers of frequency carriers belonging to the first and second frequency carrier groups comprises the step of decreasing the number of frequency carriers belonging to the first frequency carrier group when the traffic capacity per frequency carrier in the downlink direction increases, and the step of determining the numbers of frequency carriers belonging to the third and fourth frequency carrier groups comprises the step of decreasing the number of frequency carriers belonging to the third frequency carrier group when the traffic capacity per frequency carrier in the downlink direction increases.

6. A method according to claim 2, wherein the step of determining the numbers of frequency carriers belonging to the first and second frequency carrier groups comprises the step of decreasing the number of frequency carriers belonging to the second frequency carrier group when the traffic capacity per frequency carrier in the uplink direction increases, and the step of determining the numbers of frequency carriers belonging to the third and fourth frequency carrier groups comprises the step of decreasing the number of frequency carriers belonging to the fourth frequency carrier group when the traffic capacity per frequency carrier in the uplink direction increases.

7. A method according to claim 2, wherein the step of determining the numbers of frequency carriers belonging to the first and second frequency carrier groups comprises the step of rearranging a predetermined number of frequency carriers belonging to the second frequency carrier group into the first frequency carrier group when the traffic in the downlink direction increases, and the step of determining the numbers of frequency carriers belonging to the third and fourth frequency carrier groups comprises the step of rearranging a predetermined number of frequency carriers belonging to the fourth frequency carrier group into the third frequency carrier group when the traffic in the downlink direction increases.

8. A method according to claim 7, wherein the step of rearranging the first frequency carrier group comprises the step of selecting and rearranging a frequency carrier, of the frequency carriers belonging to the second frequency carrier group, which is adjacent to the first frequency carrier group, and the step of rearranging the third frequency carrier group comprises the step of selecting and rearranging a frequency carrier, of the frequency carriers belonging to the fourth frequency carrier group, which is adjacent to the third frequency carrier group.

9. A method according to claim 2, wherein the step of determining the numbers of frequency carriers belonging to the first and second frequency carrier groups comprises the step of rearranging a predetermined number of frequency carriers belonging to the first frequency carrier group into the second frequency carrier group when the traffic in the uplink direction increases, and the step of determining the numbers of frequency carriers belonging to the third and fourth frequency carrier groups comprises the step of rearranging a predetermined number of frequency carriers belonging to the third frequency carrier group into the fourth frequency carrier group when the traffic in the uplink direction increases.

10. A method according to claim 9, wherein the step of rearranging the second frequency carrier group comprises the step of selecting and rearranging a frequency carrier, of the frequency carriers belonging to the first frequency carrier group, which is adjacent to the second frequency carrier group, and the step of rearranging the fourth frequency carrier group comprises the step of selecting and rearranging a frequency carrier, of the frequency carriers belonging to the third frequency carrier group, which is adjacent to the fourth frequency carrier group.

11. A method according to claim 1, wherein the first and second frequency carrier groups and the third and fourth frequency carrier groups respectively have a plurality of frequency carrier sequentially arranged along a frequency axis.

12. A method according to claim 1, wherein
the numbers of frequency carriers belonging to the first and second frequency carrier groups are the same and fixed,
the numbers of frequency carriers belonging to the first and second frequency bands are complementarily changed, and
the numbers of frequency carriers belonging to the third and fourth frequency carrier groups are complementarily changed.

13. A method according to claim 1, wherein
said first base station is a macro-cell base station having a macro-cell as the first communication area, and
said second base station is a micro-cell base station having a micro-cell as the second communication area which is smaller than the macro-cell.

14. A method according to claim 1, wherein said first and second base stations respectively belong to different communication systems.

15. A cellular system comprising:
a plurality of first base stations having first communication areas;
a plurality second of base stations having second communication areas; and
a plurality of mobile stations for performing radio communications with said first and second base stations, said system being adapted to select and arrange a frequency carrier belonging to one of first and second frequency bands to which frequency carriers used for downlink and uplink communications between said first and second base stations and said mobile stations and in which frequency bands are arranged so as not overlap each other,
wherein a first frequency carrier group constituted by at least one frequency carrier and a second frequency carrier group constituted by at least one frequency carrier different from the first frequency carrier group are allocated to the first frequency band,
a third frequency carrier group constituted by at least one frequency carrier and a fourth frequency carrier group constituted by at least one frequency carrier different from the third frequency carrier group are allocated to the second frequency band,
said first base station performs uplink communication by using a frequency carrier belonging to the second frequency carrier group, and performs downlink communication by using a frequency carrier belonging to the third frequency carrier group, and
said second base station performs downlink communication by using a frequency carrier belonging to the first frequency carrier group, and performs uplink communication by using a frequency carrier belonging to the fourth frequency carrier group.

* * * * *